United States Patent [19]
Kohsaka et al.

[11] Patent Number: 5,299,069
[45] Date of Patent: Mar. 29, 1994

[54] MAGNETIC TAPE FORMAT FOR RECORDING DIGITAL PICTURE DATA

[75] Inventors: Nobuyuki Kohsaka; Katsumi Senba, both of Nagaokakyo, Japan

[73] Assignee: Mitsubishi Denki Kabushiki Kaisha, Tokyo, Japan

[21] Appl. No.: 707,080

[22] Filed: May 29, 1991

[30] Foreign Application Priority Data

May 29, 1990 [JP] Japan .................. 2-139416

[51] Int. Cl.$^5$ .............................. G11B 5/02
[52] U.S. Cl. ........................ 360/18; 360/35.1; 360/72.2; 358/335
[58] Field of Search ............ 360/18, 35.1, 72.2; 358/310, 335

[56] References Cited

U.S. PATENT DOCUMENTS

| | | | |
|---|---|---|---|
| 3,789,138 | 1/1974 | Terada | 360/35.1 |
| 4,549,224 | 10/1985 | Nakamura et al. | 358/310 |
| 4,549,229 | 10/1985 | Nakano et al. | 360/19.1 |
| 4,837,640 | 6/1989 | Ozaki et al. | 360/72.2 |
| 4,843,485 | 6/1989 | Reitmeier | 358/310 |
| 4,845,577 | 7/1989 | Georgis et al. | 360/72.2 |
| 5,016,119 | 5/1991 | Ogawa et al. | 360/72.2 |
| 5,070,419 | 12/1991 | Kiyonaga | 360/72.2 |

FOREIGN PATENT DOCUMENTS

3721193 7/1988 Fed. Rep. of Germany.
3933500 12/1990 Fed. Rep. of Germany.

*Primary Examiner*—Edward P. Westin
*Assistant Examiner*—Jon Santamauro

[57] ABSTRACT

In a magnetic tape on which digital picture data is recorded along helical tracks formed on the tape, the format used therefore is such that: each picture data segment consisting of picture data of one frame or one field is recorded in a plurality of consecutive tracks, the picture data segments are grouped into blocks, each block comprising a plurality of picture data segments, block numbers identifying the respective blocks are recorded in the tracks in the respective blocks, and picture numbers identifying the respective picture data segments within each block are written in the tracks which also record the picture data segments.

7 Claims, 7 Drawing Sheets

MAGNETIC TAPE FORMAT FOR RECORDING DIGITAL PICTURE DATA

FIELD OF THE INVENTION

This invention concerns digital picture data recording tape format which allows recording of multiple digital picture data along helical tracks on a magnetic tape using rotating heads, and high speed indexing and playback of the required digital picture data.

BACKGROUND OF THE INVENTION

Figure 1:
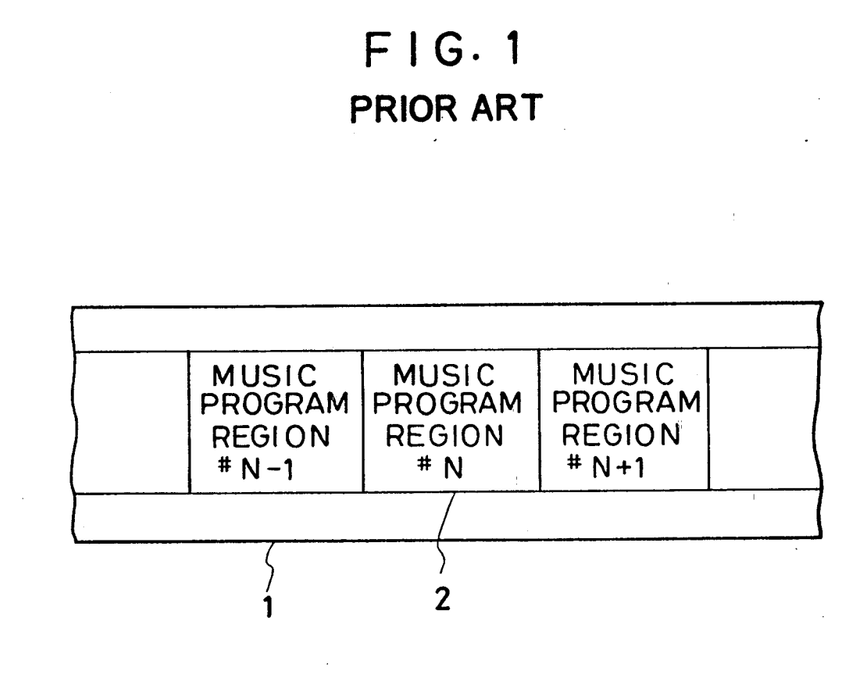
FIG. 1 illustrates the tape format of a conventional DAT.

FIG. 1 illustrates the tape format of a conventional digital audio tape (DAT) recorder in which information is recorded along helical tracks. As illustrated, music program regions are provided along the length of a magnetic tape 1. In each music program region, digital audio data for one piece of music and additional information, such as a start ID (identification) for high speed indexing, the piece-of-music number, the time code, and the like are recorded.

Figure 2:
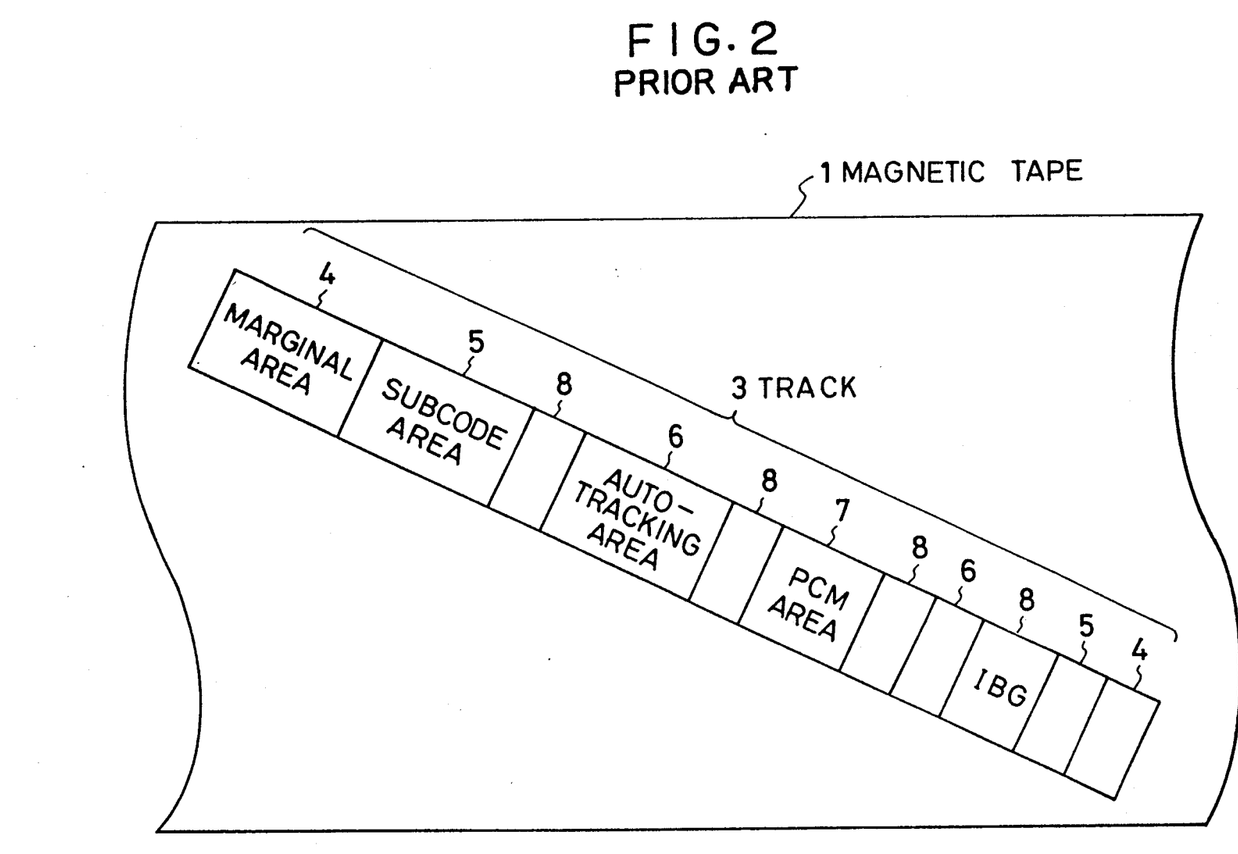
FIG. 2 illustrates an example of a conventional track format.

FIG. 2 illustrates the composition of one of the helical tracks 3 forming the music program region. As illustrated, each track comprises marginal areas 4 on both ends, subcode areas 5, auto-tracking areas 6, a PCM area 7, and interblock gaps 8. Digital data representing the audio signal is recorded in the PCM area 7.

Additional information (the start ID, the piece-of-music number, the time code, etc.) is recorded in the subcode areas 5 or the PCM area 7. The start ID is written in the subcode areas 5 of 600 tracks at the beginning of each program region. An identical start ID is written over 600 tracks so as to permit high speed indexing (e.g., at a speed 200 times higher than the normal playback speed).

The auto-tracking areas 6 are for recording information used for tracking. For the purpose of tracking, the head scanning is controlled such that the amounts of crosstalk component from the pilot signals on both adjacent tracks are equal. The interblock gaps 8 are provided to permit independent writing and overwriting in the subcode areas 5. This allows post production recording of the subcode areas 5.

The conventional DAT is composed in the above manner. When a video signal is to be recorded on the magnetic tape with the above format, the video signal of one frame, i.e., picture data segment, is recorded in the same way as the audio digital data of one piece-of-music is recorded over one music program region. When an NTSC standard video signal (resolution: 910 dots horizontal×525 lines vertical) is to be recorded, 166 tracks are required for one picture data segment. Thus, the number of tracks required for the recording of the picture data segment is smaller than the number of tracks (which is 600) over which the start ID is to be recorded for the high speed indexing. As a result, no picture data is recorded in the 434 (600−166) tracks, and the tracks of the tape are not fully utilized.

Another problem of the conventional DAT is the inability to record the video signals of different systems, such as NTSC and PAL, onto a single magnetic tape.

An additional problem is inability to align timing in recording and playback taking each picture as a unit.

A further problem is that, due to head writing timing deviations, the basic track quantity cannot be maintained during overwrite.

SUMMARY OF THE INVENTION

An object of the invention is to provide a digital picture data recording format that can eliminate or reduce the tracks in which no picture data is recorded, and still enables high speed indexing.

Another object of this invention is to provide a digital picture data recording format that can record video signals of different video signal systems on a single magnetic tape.

A further object of this invention is to provide a digital picture data recording format that enables continuous picture data recording and high speed indexing, and which is able to absorb the track position deviations in the initiation of writing that occurs during overwrite due to head writing time deviations.

In the digital picture data recording format according to the invention, a plurality of picture data segments are grouped into blocks, and the block numbers of these blocks are written into the subcode area or in the PCM area in each of a plurality of tracks, and the picture numbers identifying the picture data segment within the block are written in the subcode area or in the PCM area in each of a plurality of tracks which also record the picture data segment.

As a result of this invention, the block number of each block can be written over the number of tracks required for high speed indexing, while, at the same time, the same tracks are used for recording the picture data, and hence the tracks are fully utilized.

In addition, information indicating the video signal system or the basic track quantity, i.e., the number of tracks forming a picture data segment is recorded in the subcode area or in the PCM area in the tracks, and the number of the tracks forming a picture data segment is determined with this information. The picture data of different systems can therefore be recorded on a single magnetic tape. The number of tracks forming one picture data segment is set to be 166 tracks for an NTSC standard signal (910 dots horizontal, 525 lines vertical), and 248 tracks for a PAL standard signal (1134 dots horizontal, 625 lines vertical).

In addition, the start signal is recorded in the start area in the specified number of tracks at the beginning of a group of tracks for each picture data segment. The end signal is recorded in the specified number of tracks at the end of the group of tracks for each picture data segment. The picture number is recorded in the tracks between them, which may be all of the remainder of the group of tracks. These are recorded in the subcode area or the PCM area. Thus, continuous picture recording and indexing are achieved.

Furthermore, dummy regions are provided between picture data segments. During overwriting, the dummy area is able to absorb deviations of the writing initiation position due to deviations in head write timing.

DETAILED DESCRIPTION OF THE EMBODIMENTS

An embodiment of this invention will now be described with reference to FIG. 3A to FIG. 3C, and FIG. 4 to FIG. 7.

Figure 3A:
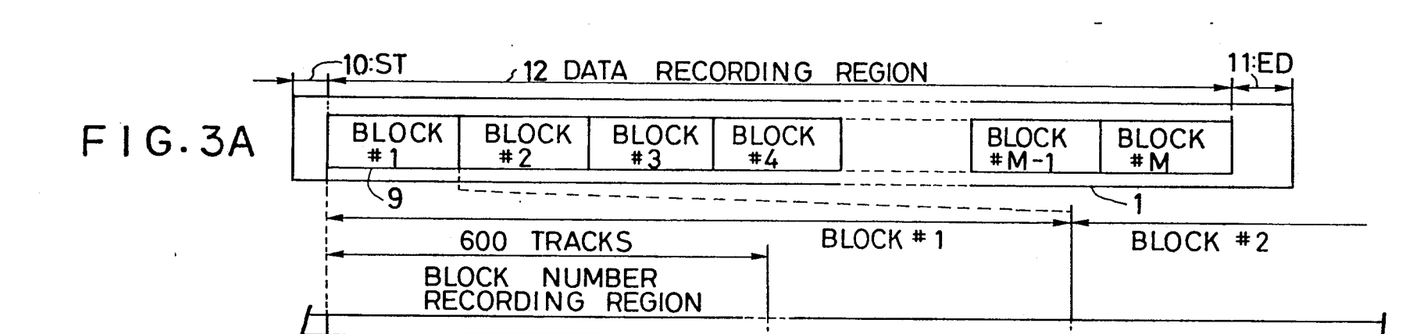
FIG. 3A illustrates a tape format of this embodiment.

As illustrated in FIG. 3A, the tape format is comprised of a data recording region 12, an ST region 10 extending from the starting edge of the magnetic tape 1 to the starting edge of the data recording region 12, and an ED region 11 extending from the end of the data recording region 12 to the end of the magnetic tape 1.

The data recording region 12 consists of M blocks 9.

Figure 3B:
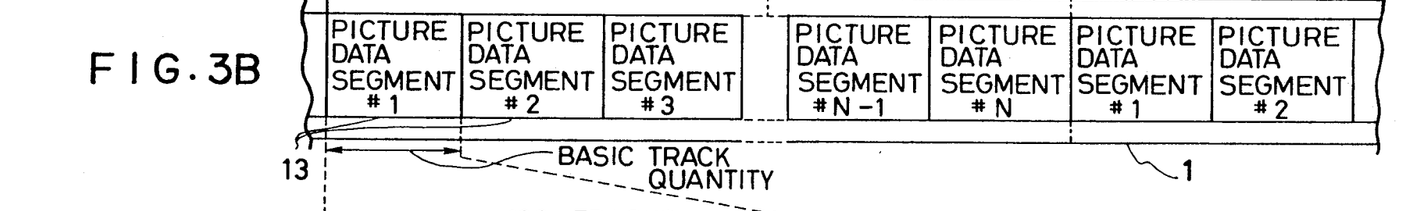
FIG. 3B illustrates the composition of picture data of one block.

As illustrated in FIG. 3B, each block 9 is comprised of N picture data regions 13. Each of the picture data regions 13 consists of a predetermined number (e.g., 166) of consecutive tracks and records picture data forming one picture data segment. Each picture data segment (recorded in the picture data region 13) is comprised of digital data corresponding to the video signal of one frame or one field.

The basic track quantity, i.e., the number of tracks required for recording each picture data segment depends on the video signal system. For example, for an NTSC standard signal (910 dots horizontal, 525 lines vertical) 166 tracks are required. For a PAL standard signal (1134 dots horizontal, 625 lines vertical), 248 tracks are required. In the case of NTSC system, if 10 picture data regions are made to form a block 9, each block consists of 1660 tracks.

Figure 3C:
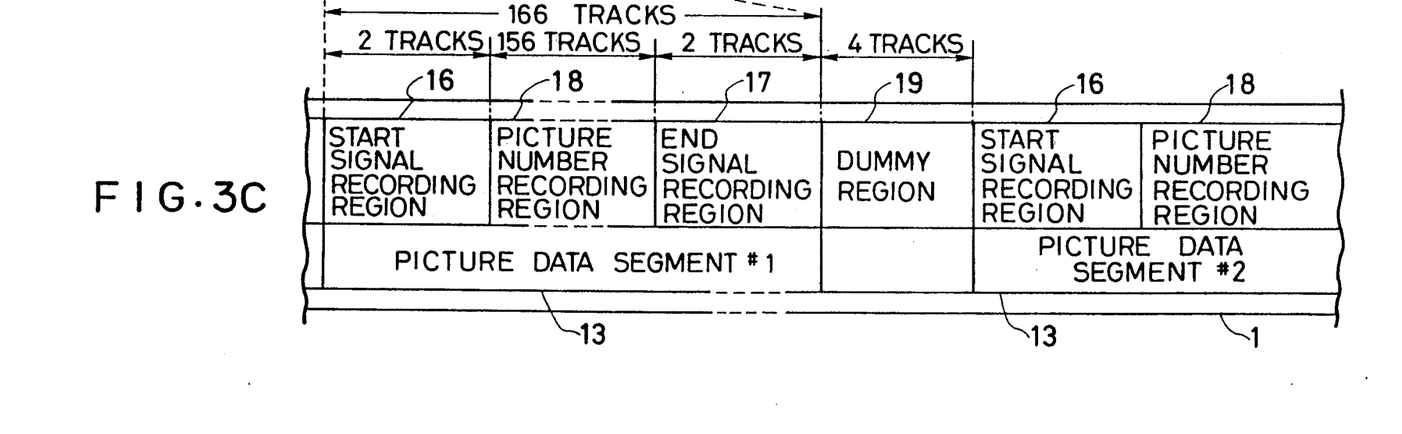
FIG. 3C illustrates the composition of a single picture data area and dummy area.

As illustrated in FIG. 3C, in the tracks of each picture data region 13, picture data as well as the start signal, the end signal or the index signal, i.e., the picture number, is recorded.

More specifically, in the two tracks at the beginning of each picture data region 13, a start signal is recorded. The start signal identifies the starting edge of the picture data region 13. The assembly of the areas of the 2 tracks in which the start signal is recorded is regarded as forming a start signal recording region 16.

In the 8 tracks at the end of each picture data region 13, an end signal is recorded. The end signal identifies the end of the picture data region 13. The assembly of the areas of the 8 tracks in which the end signal is recorded is regarded as forming an end signal recording region 17.

In the remaining 156 tracks between the start signal recording region 12 and the end signal recording region 13, a picture number is recorded. An identical picture number is recorded in the 156 consecutive tracks, allowing a high speed indexing, e.g., at a speed of about 10 times higher than the normal playback speed. The assembly of the areas of the 156 tracks in which the picture number is recorded is regarded as forming a picture number recording region.

The picture data is recorded in the same tracks as the start signal, the picture number or the end signal is recorded, but at different areas, as will be more apparent from the description which will be made with reference to FIG. 4 to FIG. 7

Dummy regions 19 consisting of 4 tracks are interposed between adjacent picture data regions 13. The dummy regions 19 function to absorb writing start position deviations due to magnetic head write timing variations during overwrite.

Figure 4:
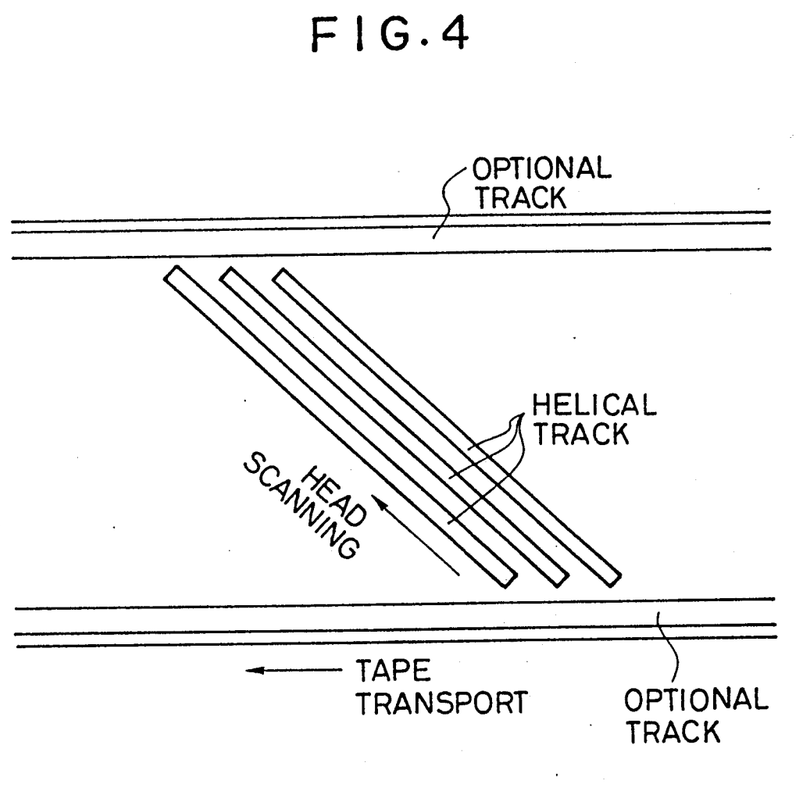
FIG. 4 is a diagram showing how the helical tracks are formed on the tape.

FIG. 4 is a tape data format showing how helical tracks are formed on the tape. As illustrated, the tracks forming the picture data segments are helical tracks at an angle with respect to the length of the tape, i.e., the direction of tape transport. In this connection, it should be noted that in FIG. 3A to FIG. 3C, the inclination of the tracks are neglected, and the allocation of the respective regions along the length of the tape is shown schematically.

Figure 5:
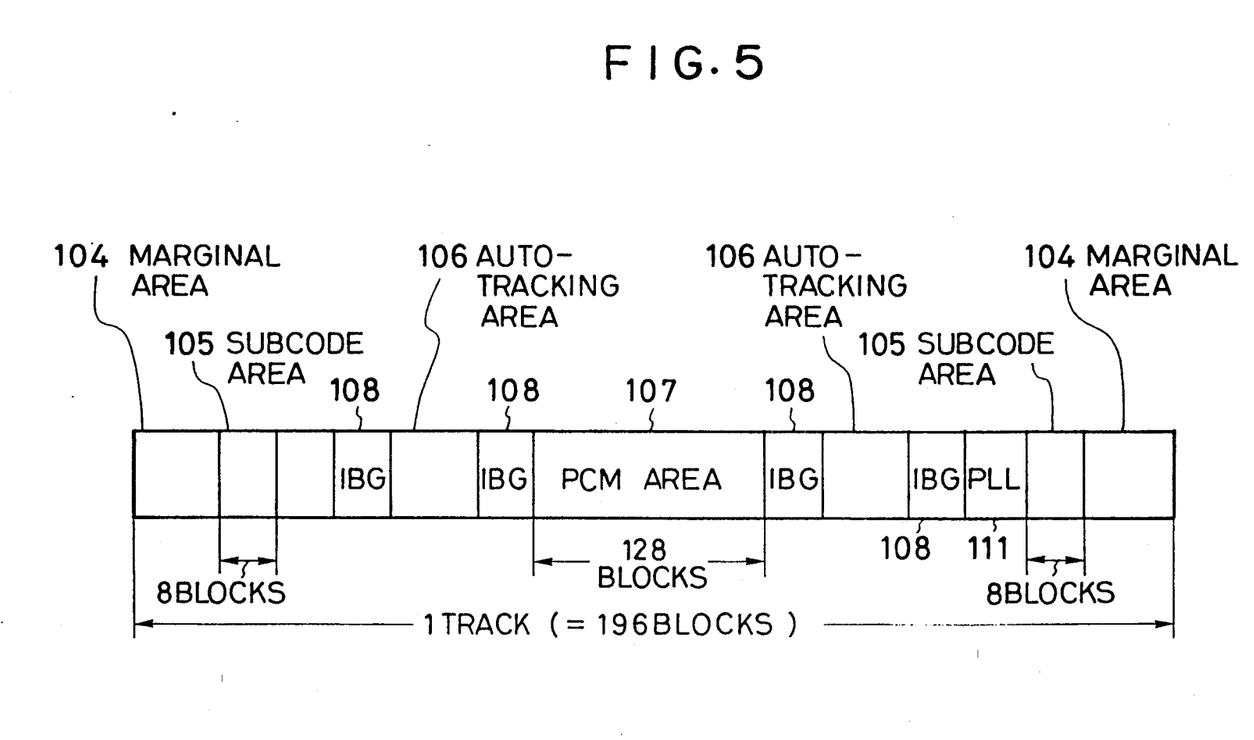
FIG. 5 shows a track format showing the arrangement of the areas on a track.

FIG. 5 shows a track format showing the arrangement of the areas on a track. As illustrated, each track is composed of margin areas 104 of 11 blocks on both ends, subcode areas 105 of 8 blocks, interblock gaps 108 of 3 blocks, auto-tracking areas 106 of 5 blocks, and a PCM area of 128 blocks. Each block has a length of 288 bits, and the term "block" as used in connection with FIG. 4 should not be confused with the term "block" as used in connection with FIG. 3A and FIG. 3B.

Figure 6:
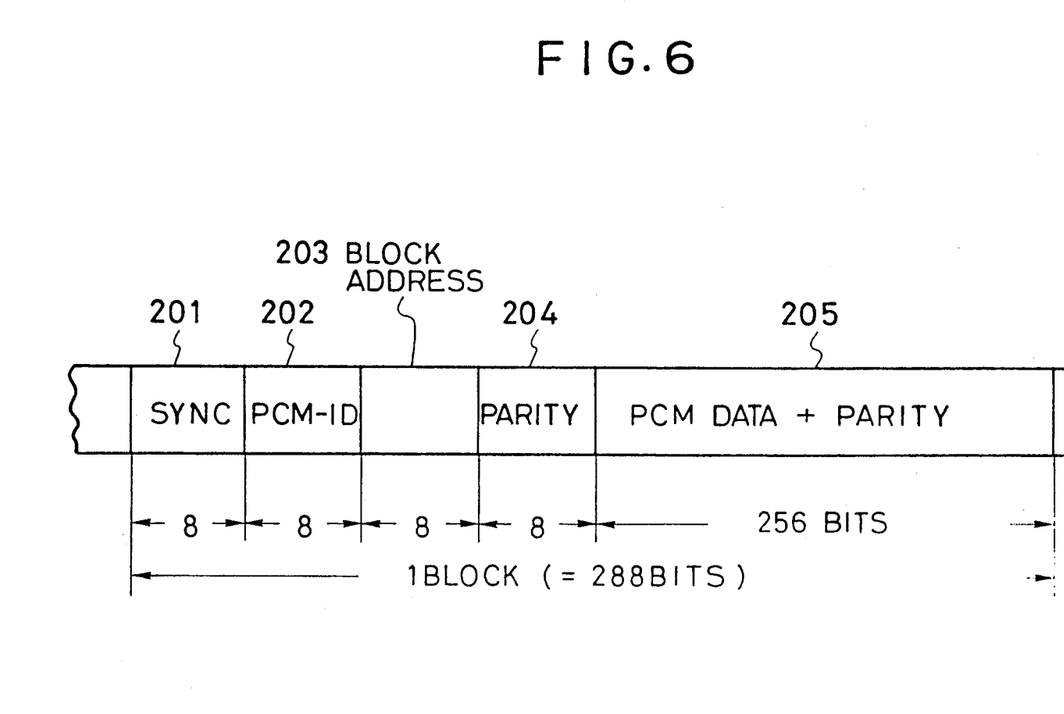
FIG. 6 is a block format showing the composition of each block within a PCM area.

FIG. 6 is a block format showing the composition of each block within the PCM area 107. As illustrated, each block in the PCM area 107 comprises a sync sub-area 201 of 8 bits, a PCM-ID sub-area 202 of 8 bits, a block address sub-area 203 of 8 bits, a parity area 204 of 8 bits, and a PCM data and parity sub-area 205 of 256 bits. The PCM data and parity sub-area 205 is for recording picture data.

In this embodiment, the PCM-ID sub-area 202 is used for recording the information indicating the video signal system.

Figure 7:
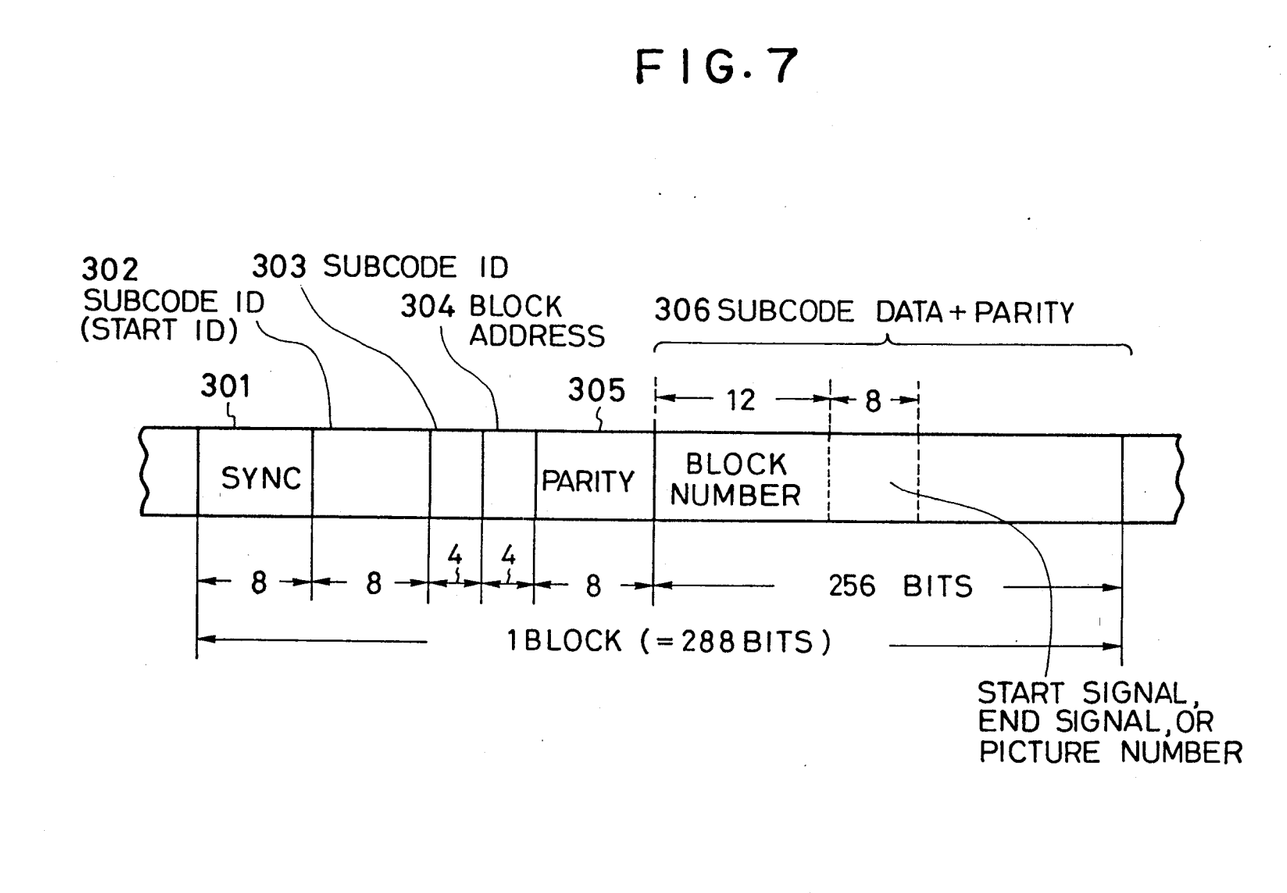
FIG. 7 is a block format showing the composition of each block within a subcode area.

FIG. 7 is a block format showing the composition of each block within the subcode area 105. As illustrated, each block in subcode area 105 comprises a sync sub-area 301 of 8 bits, a subcode-ID sub-area 302 of 8 bits, a subcode ID sub-area 303 of 4 bits, a block address sub-area 304 of 4 bits, a parity area 305 of 8 bits, and a subcode data and parity sub-area 306 of 256 bits. The subcode data and parity sub-area 306 records, in the first 12 bits, the block number of 3 digits. An identical block number is written in 600 consecutive tracks within the block, to permit high speed indexing of 200 times than the speed of conventional indexing. In the illustrated embodiment, the block number is recorded in the 600 tracks at the beginning of each block, as shown in FIG. 3B.

The subcode data and parity sub-area 306 also records, in the subsequent 8 bits, the start signal, the end signal, or the picture number depending on whether the particular track (partially) belongs to the start signal recording region 16, the end signal recording region 17 or the picture number recording region 18 (FIG. 3C). In other words, the subcode sub-area in the tracks partially belonging to the start signal recording region 16 (FIG. 3C) records the start signal. The subcode sub-area in the tracks partially beoonging to the end signal recording region 17 (FIG. 3C) records the end signal. The subcode sub-area in the tracks partially belonging to the picture number recording region 18 (FIG. 3C) records the picture number.

For indexing an arbitrary picture data segment, first indexing at the speed 200 times higher is performed by reference to the block numbers, to index the block to which the desired picture data segment belongs, and then indexing at the speed of 10 times higher is performed by reference to the picture numbers, to index the picture data segment within the block.

Since each block 9 is composed of 1,660 tracks, 600 tracks in which an identical block number is written to enable high speed indexing can be accommodated within the block. This is in contrast to the conventional tape format in which each picture data element is not grouped into blocks and the start ID for each picture data segment had to be recorded over 600 tracks resulting in tracks in which the start ID is recorded but the picture data is not recorded.

In the above embodiment, the video signal recorded is the NTSC standard video signal. However, this could be a PAL standard signal, or RGB TTL, RGB analog or Y/C separate signal.

Also, in the above embodiment, 2 tracks were used for recording the start signal, 8 tracks for the end signal, and 4 tracks for the dummy area 19. However, any other number of tracks, e.g., a multiple of two tracks, may be used for the respective areas.

In the above embodiment, the block number of each block is written in 600 tracks, but the block number may be written in a greater or lesser number of tracks depending on the speed of indexing.

In the above embodiment, the PCM-ID sub-area 202 is used to record the video signal system. But the PCM-ID sub-area 202 may alternatively or additionally be used for recording the block number, the start signal, the end signal, and the picture number.

In the above described embodiment, the information indicating the video signal system is recorded in the PCM-ID sub-area 202 in the PCM area 107 of each of some or all of the tracks. As an alternative, this information may be recorded in the subcode data and parity sub-area 306 in the subcode area 105.

Also, in the above embodiment, a video signal was recorded. However, drawings, charts and other image signals may also be recorded.

According to the present invention, the picture data segments are grouped into blocks, and the block numbers for high speed indexing are recorded in a required number of tracks within the block, and the indexing of the picture data segment within each block can be made by reference to the picture number recorded in some (or most, in the illustrated embodiment) of the tracks assigned to the particular picture data segment.

The composition maintains the number of tracks required for high speed block number indexing and enables high speed indexing taking a block as a unit. Also, the undesirable tracks in which no picture data are recorded are eliminated. This results in the capability of recording a greater number of pictures.

Also, since the information indicating the video signal system or the basic track quantity, i.e., number of tracks for recording the data of a single picture is also recorded, and the basic track quantity is determined in accordance with such information, video signals of different systems can be recorded on a single tape.

Also, since the start signal, the end signal and the picture number of each picture data segment are recorded in succession in the subcode area or the PCM area, continuous picture data recording and indexing are enabled.

Also, since the dummy regions are provided between picture data segments deviations in the head writing start position can be absorbed when overwriting.

What is claimed is:

1. A method of recording digital picture data along helical tracks on a magnetic tape, comprising the steps of:
    (a) recording each picture data segment including picture data of one frame or one field in a plurality of consecutive tracks;
    (b) grouping the picture data segments into blocks, each block including a plurality of picture data segments;
    (c) recording block numbers in at least some of the tracks, identifying the respective blocks in the respective tracks, in the respective blocks;
    (d) recording picture numbers identifying the respective picture data segments within each block in the tracks which record the picture data segments; and
    (e) recording information indicating the number of tracks for one picture data segment in the tracks which record the picture data segment.

2. The method of claim 1, wherein each track includes a PCM area and a subcode area, the picture data segments are recorded in the PCM area and the block numbers are recorded in part of the PCM area or the subcode area.

3. The method of claim 1, wherein the number of tracks in each block containing the block number is of tracks for recording one picture data segment.

4. The method of claim 1, wherein the picture number identifying the picture data segment is recorded in each track which record the picture data segment.

5. The method of claim 1, wherein a start signal identifying the start point of each picture data segment and an end signal identifying the end point of each picture data segment are recorded in the tracks which record the picture data segment.

6. The method of claim 5, wherein the start signal and the end signal are recorded in part of the PCM area or the subcode area in the tracks in which the picture number is not recorded.

7. The method of claim 1 further comprising the steps of:
    (e) forming dummy regions in a predetermined number of tracks and between adjacent picture data segments, the dummy regions containing no picture data segments.

* * * * *